United States Patent [19]

Horton et al.

[11] Patent Number: 4,762,361
[45] Date of Patent: Aug. 9, 1988

[54] FOLDING DEVICE FOR HEAVY CURTAINS

[75] Inventors: Terry Horton, Whittier; Emilio Zavalza, Walnut, both of Calif.

[73] Assignee: Utility Trailer Mfg. Co., City of Industry, Calif.

[21] Appl. No.: 64,102

[22] Filed: Jun. 19, 1987

[51] Int. Cl.$^4$ .............................................. B60J 5/06
[52] U.S. Cl. .................... 296/181; 296/183; 160/84.1; 16/277
[58] Field of Search ............ 296/181, 183; 160/84 R, 160/186

[56] References Cited

U.S. PATENT DOCUMENTS 3,709,552  1/1973  Broadbent ........................ 296/183
4,083,395  4/1978  Romano .......................... 160/84 R
4,545,611  10/1985 Broadbent ........................ 296/183
4,582,109  4/1986  Fairbanks ........................ 160/84 R
4,700,985  10/1987 Whitehead ........................ 296/181

Primary Examiner—Robert R. Song
Attorney, Agent, or Firm—Lyon & Lyon

[57] ABSTRACT

A curtain-sided vehicle in which there is a multiple panel curtain suspended from rollers engaging a rail along the roof of the curtain-sided vehicle. On each end of the curtain is attached a sliding door structure which also has rollers engaging the rail running along the roof. Hooks on the bottom of the sliding doors and the curtain slidably engage the platform of the vehicle. The curtain is pleated when one of the doors is slid open to gain access to the cargo area of the vehicle. To aid in pleating the curtain, biased hinge devices, located in each panel, bias the curtain away from the cargo area and facilitate accurate and compact pleating of the curtain.

2 Claims, 2 Drawing Sheets

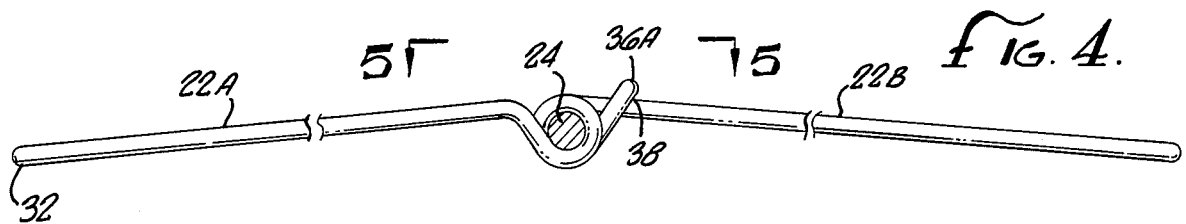
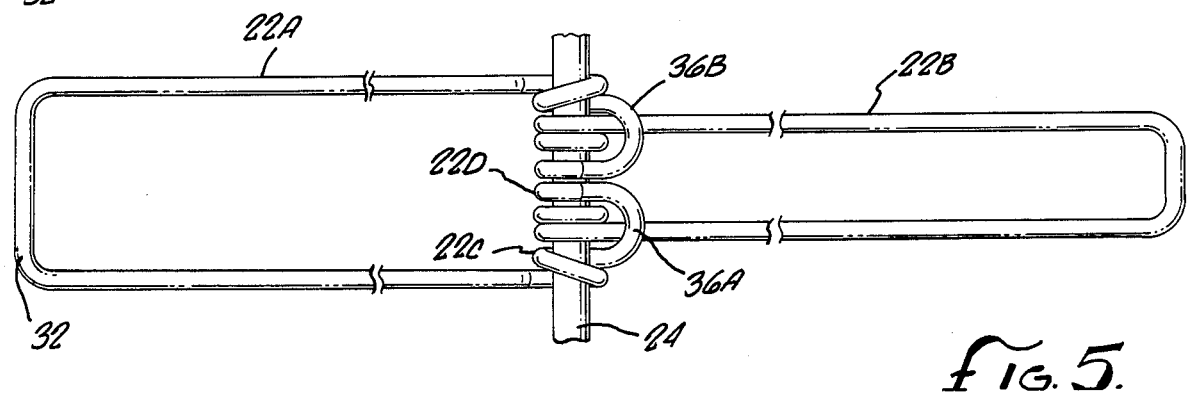
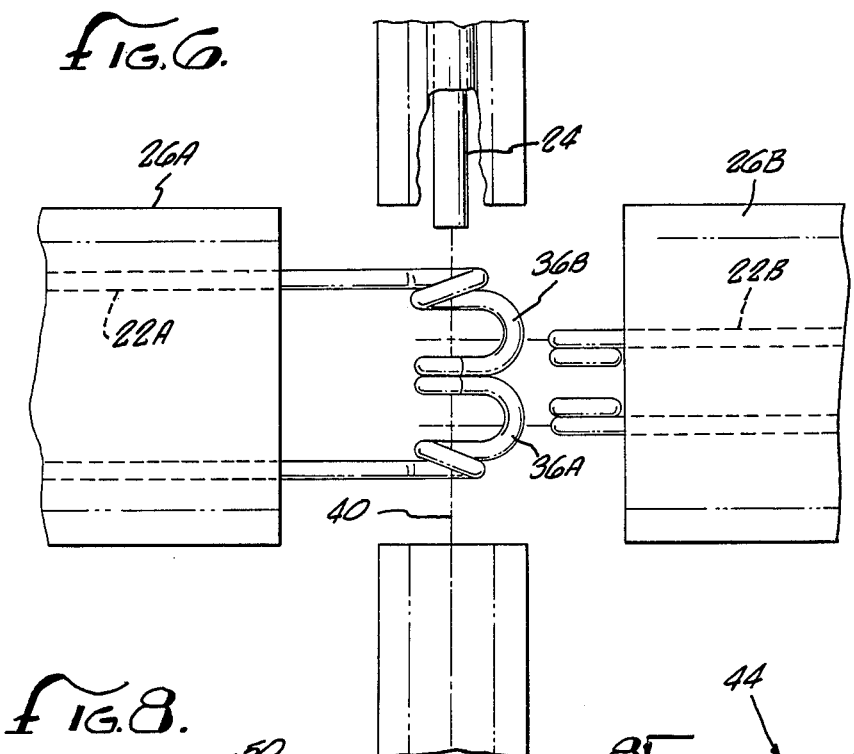
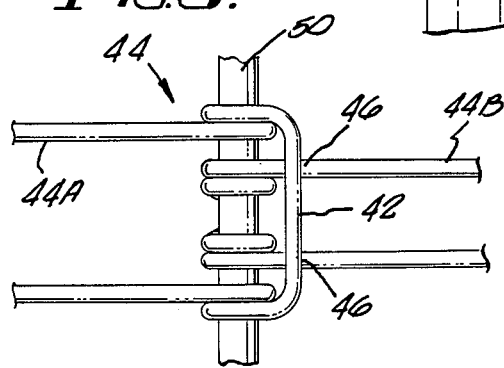
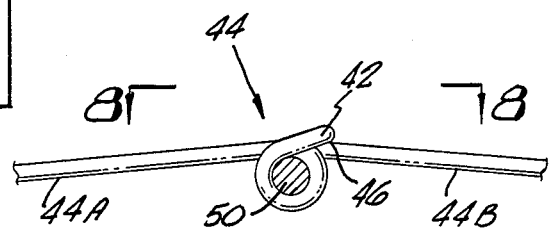

FOLDING DEVICE FOR HEAVY CURTAINS

BACKGROUND

The invention relates to curtain-sided vehicles of the type having slidable doors attached to each end of a curtain. The curtain is used in conjunction with the doors, to close an open side of the vehicle. When the side of the vehicle is closed, each door engages an end of the vehicle by a hook or over center latch which causes the curtain to be pulled taut. When access is desired to the cargo area, the sliding door panels are unlatched and slid along the length of the trailer causing the curtain to relax and fold in a pleated manner. It is desirable to have the curtain fold into a compact position so that there is maximum access to the cargo area. An arrangement for causing the curtain to fold in a pleated manner is described in U.S. Pat. No. 4,545,611. The arrangement in the '611 patent uses biasing strips that urge a portion of the curtain away from the cargo area as the curtain pleats or folds. The biasing strips are described as strips of plastic material slightly curved to give the required bias. The biasing strips initially cause the curtain to fold outward from the cargo area. However, as the sliding doors are moved closer and closer together, the biasing strips operate to prevent the curtain from being completely folded in a compact position. If the sliding door and curtain are pushed into a compact position, the biasing strips exert a force tending to push the doors away from each other preventing maximum access to the cargo area. Reduced access to the cargo area limits the maximum load size and makes it more difficult to insert and move long loads into and from the cargo area.

SUMMARY OF THE INVENTION

The present invention is a biased hinge device having two arms which are inserted into hinge pockets located on each panel of a folding curtain. The hinge pockets are sewn or welded onto the curtain panels. In the preferred arrangement there are two biased hinge devices located on each curtain panel, one being located near the top of the curtain panel and another being located near the bottom of the curtain panel. A rod pocket extents vertically between the two biased hinge devices. A rod is inserted into the rod pocket and the rod extends through a center portion of the biased hinge device allowing each arm of the hinge to rotate around the axis of the rod. On either side of the curtain panel is located a vertical pole pocket. A pole is inserted in the pole pocket which extends from the top of the curtain to the bottom of the curtain. The pole is fastened securely to the curtain. At the top of the curtain, the pole is attached to rollers which engage a rail along the roof of the trailer. At the bottom of the pole is a hook for slidably engaging the bed of the trailer. The biased hinge device is biased at a 5 to 6 degree angle to initiate the pleating of the curtain. When tension is released from the curtain, by opening one of the sliding panels on either end of the curtain, the biased hinge device biases the curtain outward from the vehicle for the first 5 to 6 degrees of the pleating action. As the door and curtain are pushed to the open position, each of the panels are pleated in a compact manner maximising access to the load. The pleats or folds are more compact because the biased hinge device offer no resistance to the pleating action initiated by the 5 to 6 degrees of bias and continued by sliding the door and curtain into the open position. There is no resistance from the biased hinge because each arm of the biased hinge device can rotate freely around the rod. Each pleat is therefore more compact allowing the doors to be pushed closer together without creating a force which would cause the doors to be pushed apart.

Another important feature is the location of the hinge pockets in relation to the vertical pole pocket. The ends of the biased hinge device arms and the hinge pockets both overlap onto the vertical pole pockets. In the area where there is a vertical pole pocket, the material is two layers thick. The curtain has a tendency to fold at the edge of the pole pocket where there is only one layer of curtain material. Since the spring arm pockets overlap on to this pole pocket area, the curtain is caused to fold in the area of the pole pocket where there is double curtain material. This makes a smaller fold which also contributes to the compact folding of the curtain.

Accordingly, it is an object of the present invention to provide an improved device for causing a curtain to fold outward from the load in a compact manner when the curtain is slid into the open position. It is another object of the present invention to provide a hinge pocket which overlaps the pole pocket also causing the curtain to fold in more compact manner.

BRIEF DESCRIPTION OF THE DRAWINGS

An embodiment of the present invention will now be described by way of example, with reference to the accompanying drawings, in which:

FIG. 4 is a top view of the biased hinged device;

FIG. 5 is a side view of the biased hinged device;

FIG. 6 is a side view of the biased hinge device located in the hinge pocket and also showing the manner in which the rod is inserted through the center of the biased hinge device;

FIG. 7 is a top view of an alternate hinge device;

FIG. 8 is a side view of the alternate hinge device shown in FIG. 7; and

DETAILED DESCRIPTION OF THE PREFERRED EMBODIMENT

Figure 1:
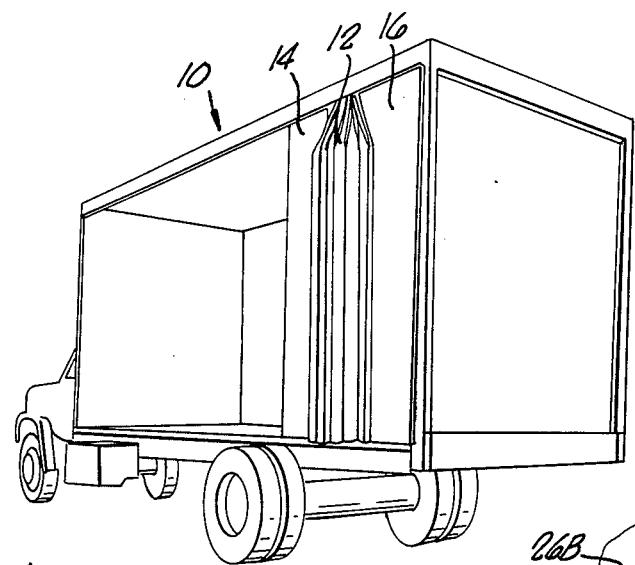
FIG. 1 is a perspective view of a curtain-sided vehicle with the curtain shown in the open position.

FIG. 1 is a perspective view of a curtain-sided vehicle 10 with a curtain 12 and the sliding door panels 14 and 16 shown in the open position. Horizontally spaced poles run from the top of curtain 12 to the bottom. Attached to the poles at the top are a plurality of rollers (not shown) which slidably engage a rail (not shown) running along the side of the vehicle at the roof. Attached to the top of the sliding door panels 14 and 16 are rollers which slidably engage the same rail.

Figure 9:
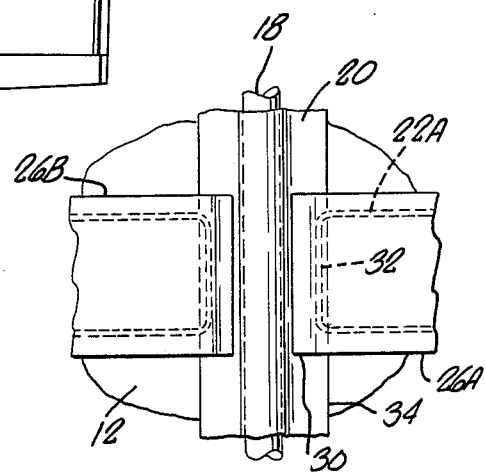
FIG. 9 is a side view of the folding curtain showing the overlap of the hinge pockets onto the pole pocket area and the location of the biased hinge device arms in relation to the pole pocket area.
Figure 2:
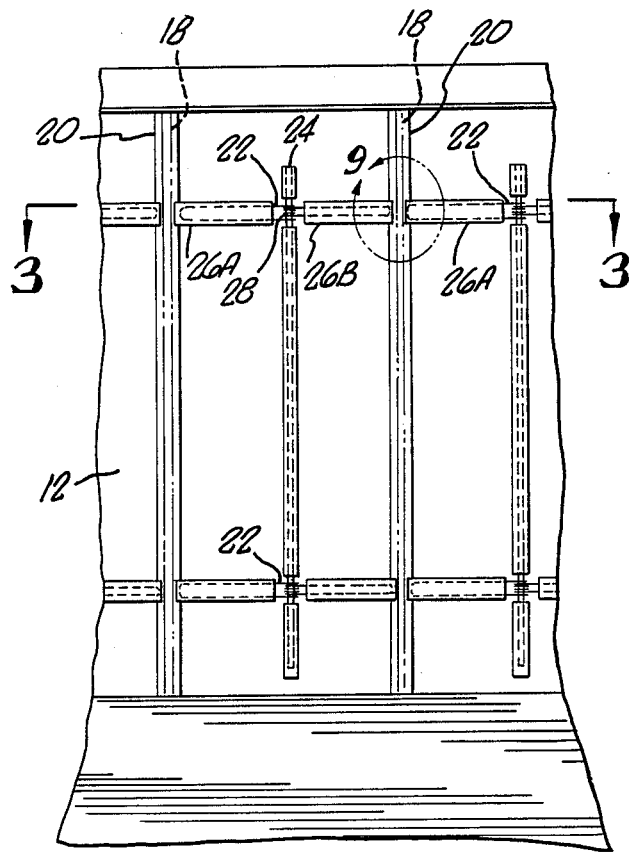
FIG. 2 is a side view of a portion of the curtain showing the pole pocket, hinge pockets, biased hinge device and rod pocket.

FIG. 2 shows a portion of curtain 12 in the closed position. Within pole pocket 20 is located the pole 18 to which the curtain 12 is securely fastened. A biased hinge device 22 is shown inserted in hinge pockets 26A and 26B with a rod 24 running through the center of the biased hinge devices 22. Each of the hinge pockets 26A and 26B is shown to overlap the pole pocket 20. This overlap is shown in more detail in FIG. 9. The end 30 of hinge pocket 26A is shown to overlap the area of pole pocket 20. This allows the curtain 12 to fold, at the end 32 of the biased hinge device arm 22A instead of at point 34 of the pole pocket 20 where the curtain materials is only one layer thick. This makes for a smaller fold and a more compact folded curtain.

Figure 3:
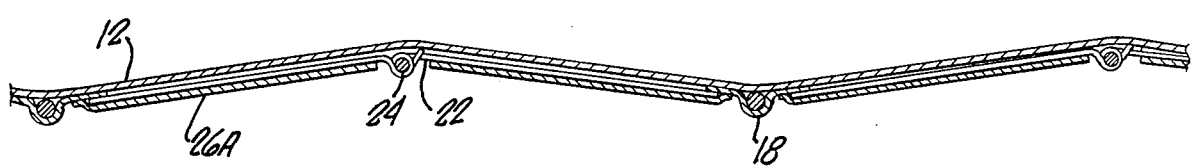
FIG. 3 is a top cutaway view along lines 3—3 of FIG. 2 showing the pleating action initiated by the bias of the biased hinge device.

FIG. 3 shows a top view of the curtain 12 along lines 3—3 of FIG. 2. As tension is released from the curtain, the biased hinge device biases the curtain 12 away from the cargo area (the area below FIG. 3) of the vehicle. The rod 24 is shown in the center portion of the biased hinge device 22. As shown in FIG. 2, the rod 24 extends between an upper biased hinge device and a lower biased hinge device. Thus, the force exerted on the curtain by the biased hinge device arm 22 is also transferred to the rod 24 causing the curtain to fold along the length of rod 24. The biased hinged device 22 must provide enough bias to prevent the curtain, in the area of the rod from being blown into the cargo area by a strong wind when tension is initially released from the curtain. Steel wire, plated with cadmium or nickle for corrosion resistance, with a 0.125 inch diameter worked well in eliminating this problem. Other shapes for the arms, such as rounded or flat and other diameters for the wire will work so long as enough bias is provided. The manner in which the biased hinge device is biased will now be discussed with reference to FIGS. 4, 5 and 6.

FIG. 4 shows a top view of the biased hinge device 22 with the rod 24 running through the center portion of biased hinge device 22. Loop 36 engages an arm 22B of the biased hinge device 22 at a bias point 38 to resist the opening of the biased hinge device 22 to a 180° completely flat position. Approximately 5 or 6 degrees before the biased hinge device is in the 180° flat position, the loop 36 engages the arm 22B of the biased hinge device 22 in a spring like fashion at bias point 38 to cause biasing or spring resistance to the further opening of the biased hinge device 22. When tension is released from the curtain and the doors and curtain are slid to the open position, the biased hinge device 22 biases the rod 24 and a portion of curtain 12 in the areas of rod 12 to a position away from the cargo area of the vehicle. The pleating action is initiated by the bias exerted on the curtain when the biased hinge device 22 moves from a nearly flat position to the bias point 38 which is ideally 175 to 174 degrees from the closed position, or 5 or 6 degrees from the 180° flat position. This bias point angle of 5 or 6 degrees can be made larger or smaller depending on the material used to make the hinge, as long as there is sufficient bias to initiate the pleating and prevent the curtain from being blown into the cargo area by a strong wind as previously described.

FIG. 5 is a side view of the biased hinge device 22 with rod 24 extending through the center portion of the hinge. As shown in FIG. 5, the arm 22A of biased hinge device 22 wraps once around the rod 24 and then loops over the the arm 22B of the biased hinge device 22B. After loop 36 is formed, the end of the arm 22A is again partially wrapped around the rod 24. As shown in FIG. 5 this arrangement is duplicated at the power portion of the biased hinge device 22 shown at areas 22C and 22D. Having two loops, 36A and 36B provides for more tension or spring resistance to the full opening of the biased hinge device 22. This in turn provides adequate bias on the curtain 12, after tension is released from the curtain, to cause the curtain to fold away from the cargo area of the vehicle even in a strong wind.

FIG. 6 shows the manner in which the arms 22A and 22B of the biased hinge device 22 are assembled. The left arm 22A of biased hinge device is shown in the left hinge pocket 26A. Similarly, the right arm 22B of biased hinge device 22 is shown in its corresponding hinge pocket 26B. The arms 22A and 22B rotate around the axis 40 of rod 24. Rod 24 is inserted, along axis 40 through the center portions of arms 22A and 22B of the biased hinge device 22. This arrangement is duplicated in both the upper and lower biased hinge devices as shown in FIG. 2.

FIGS. 7 and 8 show an alternate embodiment of a biased hinge device. In FIG. 8, the right arm 44B of the alternate hinge device 44 is similar to the arm 22B of biased hinge device 22. However, the left arm 44A of alternate hinge device 44 forms an elongated loop 42 which contacts the right arm 44B of the alternate hinge device 44 at points 46. If the same guage steel wire is used, this arrangement provides less tension or resistance to fully opening or flatening the alternate hinge device 44 because there is only one extended loop 42 as opposed to two separate loops 36A and 36B as shown in FIGS. 5 and 6. A larger gauge wire could be use to provide the same of bias. The extended loop 42 engages the right arm 44B of alternate hinge device 44 at a point 5 to 6 degrees before the alternate hinge device is fully open.

FIG. 7 is a top view of the alternate hinge device 44 shown in FIG. 8 showing the right arm 44B and the left arm 44A of alternate hinge device 44 and also showing one of the points 46 where the extended loop 42 engages the right arm 44B of alternate hinge device 44. A rod 50, shown in cross-section, extends through the center portion of the alternate hinge device 44. The rod 50 is also shown in FIG. 8.

While the preferred embodiment of the present invention has been shown and disclosed in the drawings and specifications, alternate embodiments of the present invention may be apparent to a person of ordinary skill in the art and this application is intended to include those alternate embodiments within the scope of the appended claims.

What is claimed is:

1. A curtain sided vehicle having at least one open side to provide access to the cargo area of said vehicle, the open side being closed by two slideable doors and a foldable curtain, said foldable curtain is attached to and extends between the slideable doors, the foldable curtain is comprised of a plurality of horizontally spaced pole pockets defining a plurality of panels, located in said pole pockets are poles extending vertically from the bottom of said foldable curtain to the top of said foldable curtain, said poles being securely fastened to said foldable curtain, at least two of said panels comprising the area between pole pockets the improvement comprising:

a hinge pocket, said hinge pocket having a right pocket and a left pocket, each said right and left pocket overlapping onto a pole pocket and extending horizontally to the horizontal center portion of said panel, vertical rod pocket means extending vertically from the lower portion of said panel to the upper portion of said panel and located in substantially the horizontal center of said panel and adapted to accept a vertical rod, biased hinge means adapted to be inserted into said hinge pockets and to be connected to said vertical rod at the center portion of said biased hinge means, said biased hinge means being adapted to urge the center portion of said panel and said vertical rod away from the cargo area of said curtain sided vehicle.

2. A curtain-sided vehicle as in claim 1 wherein each arm of said biased hinge means has one end that overlaps onto the area of said pole pocket to cause said curtain to fold in the area of said pole pocket while simultaneously urging the center portion of said panel and said vertical rod away from the cargo area of said curtain sided vehicle.

* * * * *